United States Patent [19]

Jenkins et al.

[11] Patent Number: 5,028,181

[45] Date of Patent: Jul. 2, 1991

[54] QUICK CHANGE RIGHT ANGLE AND OFFSET DRILL HEAD

[75] Inventors: John M. Jenkins, Huntington; Paul E. Kovach, Syosset; Murray Berger, Plainview, all of N.Y.

[73] Assignee: Grumman Aerospace Corporation, Bethpage, N.Y.

[21] Appl. No.: 522,792

[22] Filed: May 14, 1990

[51] Int. Cl.⁵ .................. B23C 5/26; B23B 31/06; B23B 31/22

[52] U.S. Cl. .................. 409/215; 279/1 B; 279/1 E; 279/75; 408/240; 433/128

[58] Field of Search .......... 279/1 B, 75, 1 E; 408/239 R, 240; 409/215; 433/126-129

[56] References Cited

U.S. PATENT DOCUMENTS

| | | | |
|---|---|---|---|
| 1,904,941 | 4/1933 | Dunn | 279/75 |
| 2,319,465 | 5/1943 | McCombs | 74/423 |
| 2,438,291 | 3/1948 | Koza | 74/423 |
| 2,567,784 | 9/1951 | Ridgeway | 408/124 |
| 2,780,942 | 2/1957 | Babcock | 74/417 |
| 3,208,318 | 9/1965 | Roberts | 81/177.85 |
| 3,532,013 | 10/1970 | Haznar | 81/177.85 |
| 3,638,519 | 2/1972 | Rebold | 81/177.85 |
| 3,713,356 | 1/1973 | Knudsen | 81/177.85 |
| 3,762,245 | 10/1973 | Smyers et al. | 81/177.45 |
| 3,777,596 | 12/1973 | Smyers, Jr. et al. | 81/177.85 |
| 3,901,098 | 8/1975 | Jinkins | 74/417 |
| 4,184,692 | 1/1980 | Benson et al. | 279/75 |
| 4,187,747 | 2/1980 | Pawlow | 81/177.85 |
| 4,188,041 | 2/1980 | Soderberg | 279/75 |
| 4,234,277 | 11/1980 | Benson et al. | 408/226 |
| 4,245,528 | 1/1981 | Hugh et al. | 81/177.85 |
| 4,273,344 | 6/1981 | Benson et al. | 279/75 |
| 4,295,395 | 10/1981 | Stifano, Jr. | 81/124.7 |
| 4,399,722 | 8/1983 | Sardo, Jr. | 81/60 |
| 4,474,077 | 10/1984 | Debelius | 74/606 R |
| 4,602,534 | 7/1986 | Moetteli | 81/177.85 |
| 4,940,410 | 7/1990 | Agap et al. | 433/128 X |

FOREIGN PATENT DOCUMENTS 160036 9/1983 Japan ............................ 408/239 R Primary Examiner—Steven C. Bishop
Attorney, Agent, or Firm—Pollock, VandeSande & Priddy

[57] ABSTRACT

A quick change right angle drill head incorporates mechanism rotating components within the drill head housing thereby resulting in a more compact package which facilitates use in space-limited locations. A single push button release enlarges a chuck opening to receive a cutting tool. An internally located compression spring becomes operative when reverse thrust forces are exerted against a cutting tool. The design of the present invention may be constructed to either lock the cutting tool into the drill head chuck or release it, upon exertion of the reverse thrust forces.

7 Claims, 3 Drawing Sheets

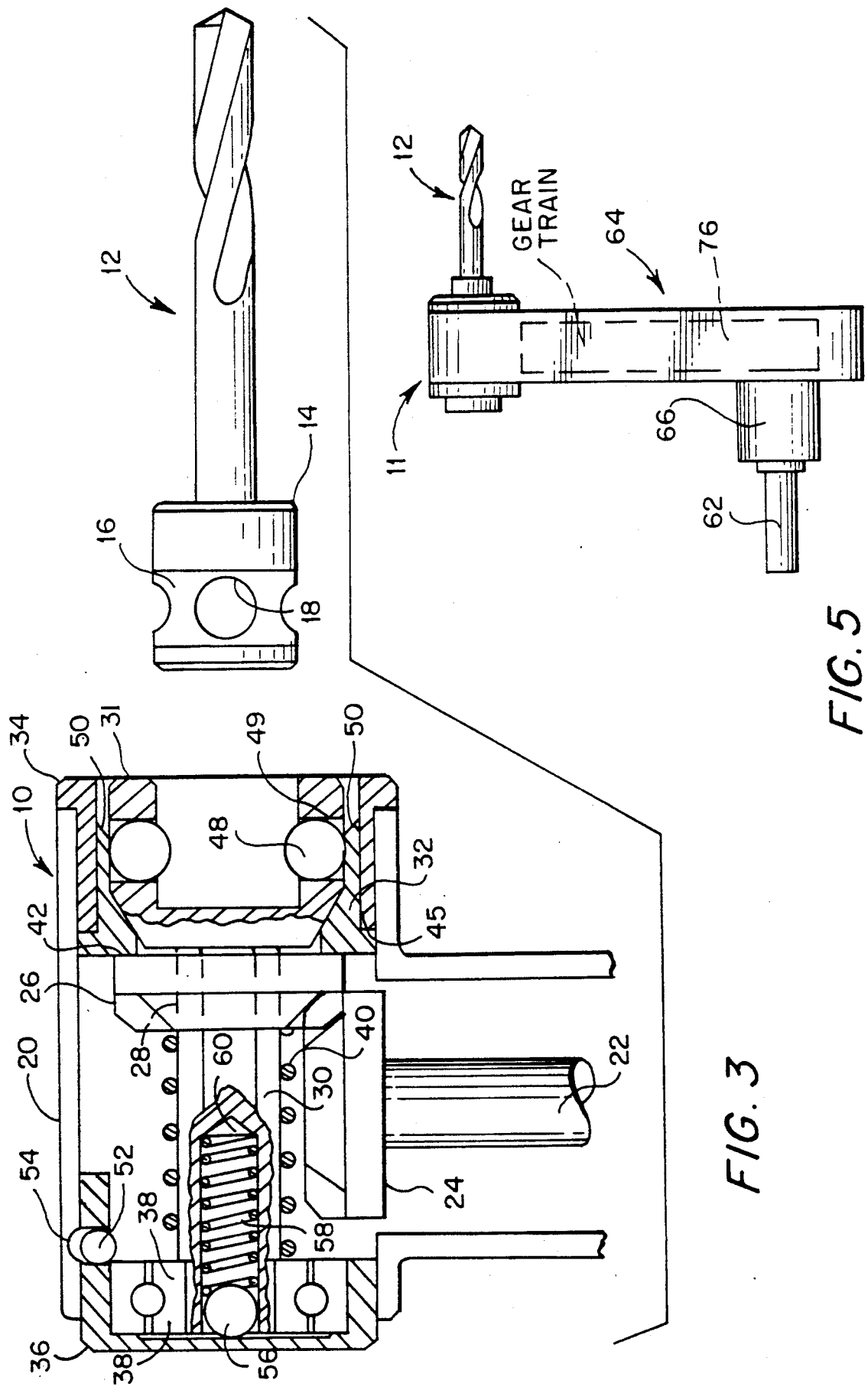

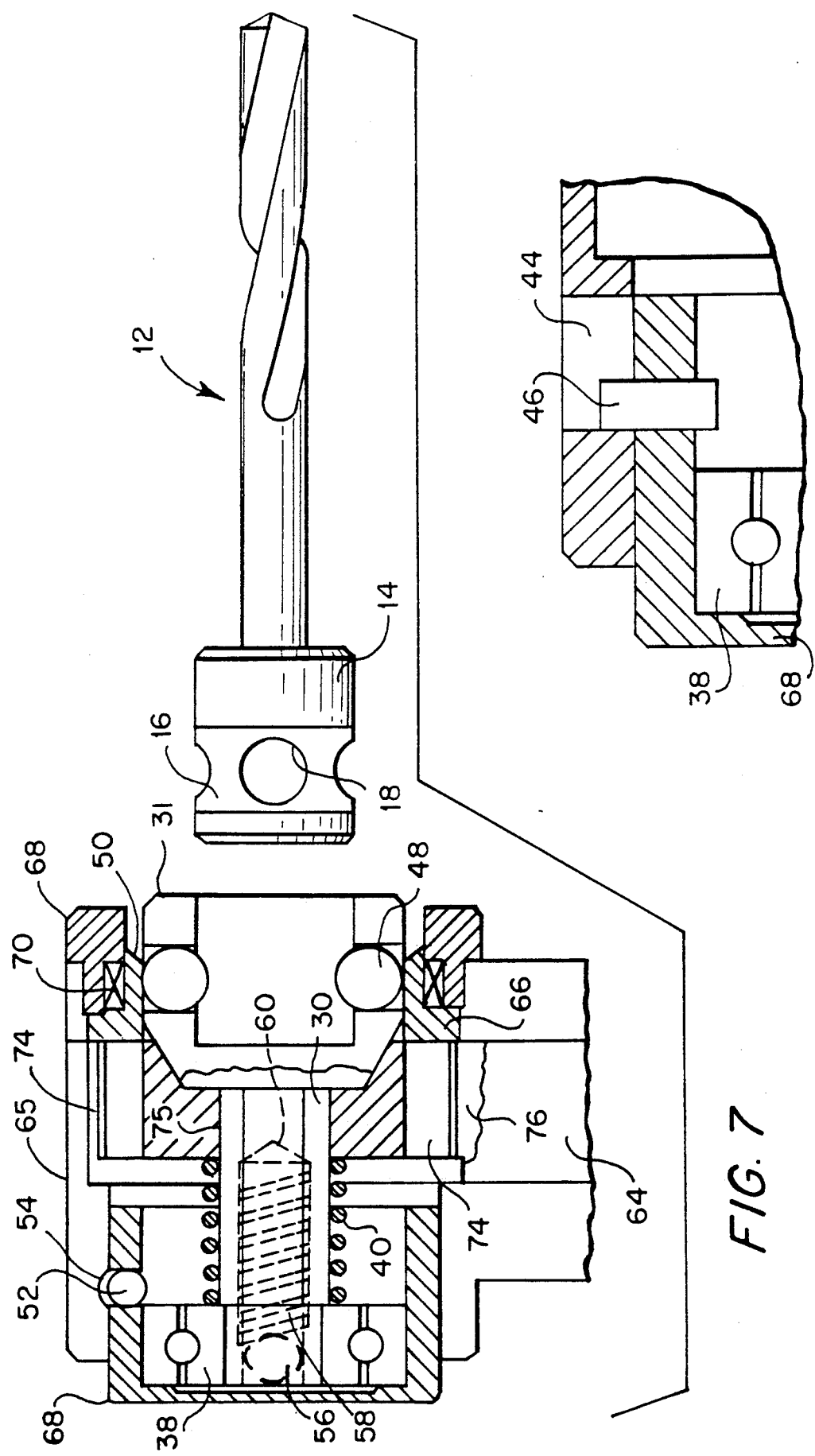

QUICK CHANGE RIGHT ANGLE AND OFFSET DRILL HEAD

FIELD OF THE INVENTION

The present invention relates to power tools, and more particularly to a right angle and offset drill head which permits quick bit change.

BACKGROUND OF THE INVENTION

In a number of industries, it is important to have a drill system with a quick change chuck. Prior art systems include those discussed in U.S. Pat. Nos. 4,184,692; 4,188,041; and 4,234,277. Drill systems of the types discussed in the patents require the addition of an adapter/chuck to an existing right angle drill head. This adds additional length to the drill head which makes it unusable in extremely space-limited locations.

A further problem with the prior art resides in the fact that many drill heads require a rotary or axial motion of the mechanism to insert or remove a drill bit. This type of motion is somewhat difficult to perform quickly and with one hand.

BRIEF DESCRIPTION OF THE PRESENT INVENTION

The present invention is an improvement of existing right angle and offset drill heads. By integrating a suitable quick-change mechanism directly into the drill head, the overall length of the assembly can be substantially shortened, thereby permitting use of the drill in smaller spaces. Further, the present system provides a single, large push-button release which is easily operated with the drill held in one hand while inserting or removing a drill bit with the other. It should be mentioned that, although the following description of the invention is directed toward a drill bit, other types of cutting tools may be employed.

Additionally, the present invention may be equipped with a means for automatically locking the drill bit into the tool chuck against reverse thrust forces which would otherwise tend to pull the drill bit out of the chuck. Optionally, the invention may be configured to permit the drill bit to be pulled free of the chuck when reverse thrust forces exceed a predetermined maximum level.

By virtue of the present invention, reduced external dimensions of an overall head may be realized. Further, the cutting tool release mechanism of the present invention includes rotating components which are totally enclosed within the body. This precludes inadvertent contact of any rotating component with the work piece or operating personnel while still providing dimensional reductions.

BRIEF DESCRIPTION OF THE FIGURES

The above-mentioned objects and advantages of the present invention will be more clearly understood when considered in conjunction with the accompanying drawings, in which:

FIG. 3 is a partial sectional view taken along a line passing through section line 3—3 of FIG. 2;

FIG. 5 is a side elevational view of a second embodiment of the present invention directed to an offset drill head assembly;

FIG. 7 is a sectional view taken along section line 7—7 of FIG. 6;

FIG. 8 is a partial sectional view taken along section line 8—8 of FIG. 6.

DETAILED DESCRIPTION OF THE INVENTION

Figure 1:
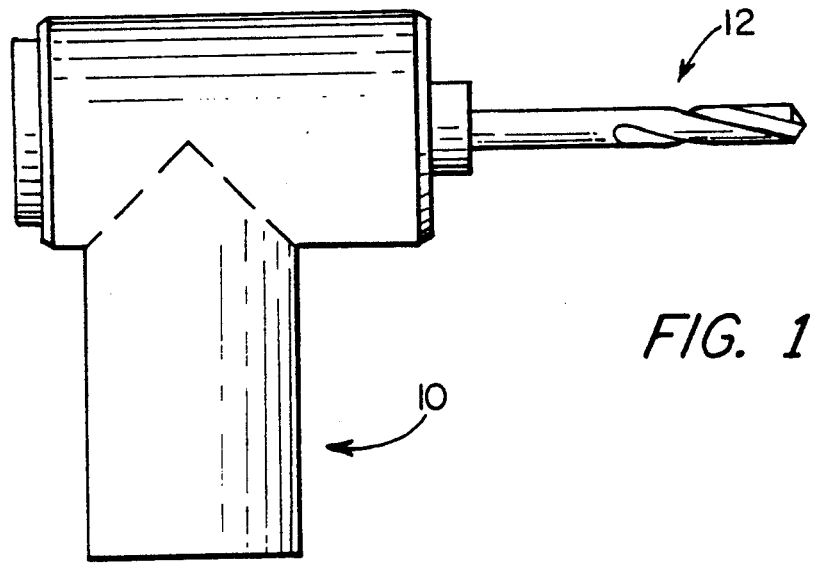
FIG. 1 is a side elevational view of a first embodiment of the present invention.

Referring to the figures, and more particularly FIG. 1, a first embodiment of the present invention is illustrated. A right angle drill head housing is generally indicated by reference numeral 10 and is seen to receive a cutting tool such as a drill bit 12 therein. FIG. 3 indicates that the base of the drill bit 12 has a conventional boss member secured thereto, as generally illustrated by reference numeral 14. The boss member includes a circular groove 16 around the periphery of the boss member and radial openings 18 are formed in the groove 16. The housing of the drill head includes a cylindrical section 20 which houses the principal components of the drill head. However, the lower illustrated portion of the housing receives a drive shaft 22 ending inwardly in a bevel gear 24. The drive shaft 22 may be driven by a number of conventional power sources, as is well known to those of skill in the art.

A second bevel gear 26 is orthogonally oriented in relationship to the first bevel gear 24 and the second bevel gear 26 includes a central passageway 28 having a non-circular (e.g. hexagonal) cross section. A similarly shaped shaft 30 extends coaxially through the second bevel gear 26 for suitable attachment to a chuck 31. The chuck receives the boss end 14 of the drill bit 12. A ramp end collar 32 is positioned peripherally outwardly of the chuck 31 and a bushing 34 provides an inner bearing surface for rotation of the collar 32.

In operation, motion is transmitted from drive shaft 22 to right angled bevel gears 24 and 26. Shaft 30 is driven by bevel gear 26 since the shaft is received within the hexagonal passageway 28 formed centrally of the bevel gear 26. Since the right end of shaft 30 is secured to the chuck 31, rotation of the shaft causes rotation of the chuck.

In order to appreciate how the drill bit 12 becomes inserted into chuck 31, continued reference is made to FIG. 3 wherein the rear end of housing section 20 is seen to be opened so as to receive an enlarged hollowed push button 36 therein. A bearing 38 is positioned in the rearward section of the hollowed push button so that the bearing radial outward surface contacts the inner cylindrical surface of push button 36 while the radially inward surface of the bearing receives a left illustrated end section of shaft 30. A compression spring is mounted along the length of shaft 30 and normally urges the push button 36 outwardly. The bevel gear 26 has its right illustrated surface bearing against an annular flange 42 of collar 32. Bushing 34 is secured to the housing and an interface is formed at 45 between bushing 34 and collar 32. Bevel gear 26 is maintained in continued gearing relationship with bevel gear 24.

Figure 4:
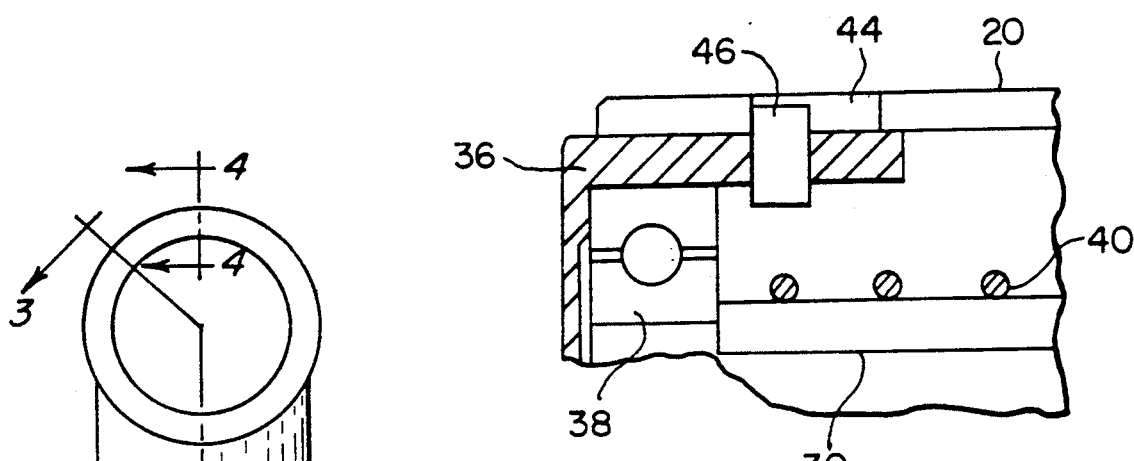
FIG. 4 is a partial sectional view taken along a plane passing through section line 4—4 of FIG. 2.
Figure 2:
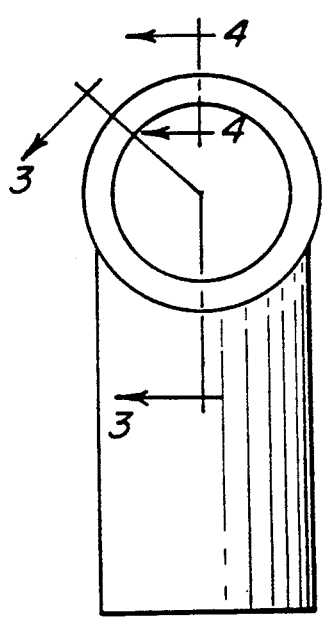
FIG. 2 is a rear elevational view of the present invention.
Figure 6:
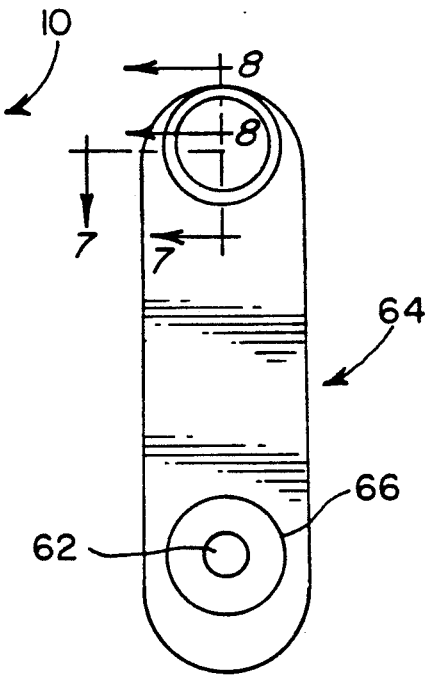
FIG. 6 is a rear elevational view of the second embodiment.

As shown in FIG. 4, a slot 44 is formed in the housing section 20 and the mechanical stop pin 46, fixed to push button 36, prevents the push button from falling out of the housing section 20.

In order to install the drill bit 12, the push button 36 is depressed inwardly while there is no motion of drive shaft 22. This inward motion causes linked displacement of shaft 30 to the right. Consequently, the chuck 31 connected to the right end of shaft 30 moves to the right. Holes 49 are formed in the chuck 31 so that detent balls 48 may be deposited therein. As chuck 31 is displaced to the right, the detent balls 48 reach the ramp end 50 of collar 32. As the drill bit boss 14 is introduced into chuck 31, the detent balls 48 are forced radially outwardly to allow full boss insertion wherein the balls engage radial openings 18. When button 36 is released, spring 40 pushes against bearings 38 and, consequently, push button 36 so as to return the latter to its normal position. At the same time the detent balls 48 have rolled upwardly across the ramp 50 so as to become again displaced radially inwardly so as to be in close securement with radial openings 18. As a result, when the drive shaft 22 is turned, this motion will be transmitted to chuck 31 and detent balls 48 which then create linked motion with drill bit 12 due to the engagement between the detent balls 48 and radial openings 18. In order to release the drill bit for quick change, the procedure is repeated whereby the detent balls again become displaced radially outwardly upon rolling over the ramp 50, thus permitting simple withdrawal of the drill bit 12.

Considering the present invention in terms of its capability to release the drill bit when thrust forces exceeding a predetermined maximum occur, reference is made to FIG. 3. When reverse thrust forces on the detent balls 48 and chuck 31 exceed a pre-compressed load of spring 40, the chuck will move in the direction of the reverse thrust causing the detent balls to move in a direction which will cause them to eventually pass over the ramp end 50 of collar 32. The radially outward displacement of the balls causes release of the drill bit 12.

If, on the other hand, automatic locking is required, a locking ball 52 is installed within the cylindrical wall of push button 36. The ball normally rests transversely opposite from groove 54, the latter being formed in housing section 20. Upon exertion of reverse thrust forces, detent balls 48, chuck 31, and bearing 38 are moved to the right when the force exceeds the prestressed load of spring 40. The outer diameter of bearing 38 is slip fit in the bore of push button 36. Therefore, the bearing will move forwardly (right direction) in relation to the push button 36 in response to reverse thrust forces. The relative displacement of push button and bearing is ensured by the second indicated spring 58 which coaxially rests inside the bore 60 axially formed in hexagonal shaft 30 and which biases a ball 56 against the inner surface of push button 36. Thus, with the push button 36 retained in an extended (outward) position, the bearing 38 advances to the right and contacts ball 52 resting in the cylindrical wall of the push button 36. The outer surface of the bearing urges the locking ball 52 radially outwardly into locking groove 54 which is formed on the inner surface of housing section 20. The push button 36 is now prevented from moving to the right (forward). The bearing continues its forward motion until it contacts pin 46 (FIG. 4) which is retained by a press fit into the push button 36. The pin 46 arrests further motion of bearing 38 and the chuck 31 is prevented from unlocking detent balls 48. As a result, the drill bit 12 is locked in position while being subjected to reverse thrust forces. When these forces are reduced, spring 40 returns the bearing 38 to the bottom of the bore formed internally of push button 36 thereby freeing the locking ball 52 from groove 54 and the mechanism is returned to normal operation.

A second embodiment of the invention is shown in FIGS. 5-8. The essential difference of the second embodiment as compared with the first resides in the fact that the drill head 11 of the second embodiment employs a drive shaft 62 which is located in parallel offset relationship to the drill bit 12. This is in contrast to the right angle drive shaft 22 of the first embodiment (FIG. 3). Diagrammatically, FIG. 5 indicates an input drive shaft 62 which rotates in a bushing or bearing 66 secured to an oblong drill head housing 64. Inside the housing is a gear train 64 of conventional design which drives a mechanism within the housing section 65, as shown in FIG. 7, which is quite similar to the first embodiment. As shown in FIG. 7, the collar 66 is positioned radially inwardly of bushing 68 with a bearing 70 present therebetween. The gear train within housing 64 has an output gear 76 which drives gear 74, the latter being located in the housing section 65. Gear 74 has a hexagonal central opening 75 through which the hexagonal-shaped shaft 30 passes. In order to facilitate an understanding of the second embodiment, common components between this and the first embodiment are denoted by identical reference numbers.

The insertion and release of drill bit 12 follows the same operation as previously described in connection with the first embodiment. Further, the second embodiment also has the capability of either releasing or locking (FIG. 8) the drill bit 12 upon exertion of reverse thrust forces, as previously explained in connection with the first embodiment.

As will be appreciated from the aforementioned description of the invention, a quick-release right angle tool head is offered which has a more compact design than the prior art and therefore permits greater utilization in space-limited locations. Further, the present invention offers a single push button release which is easily operated with the drill head held in one hand while inserting or removing a cutting tool with the other. The body of the tool encloses all rotating components thereby precluding inadvertent contact by any rotating component with the work piece or operating personnel. A further distinct advantage of the invention is the optional capability of either releasing or locking a cutting tool into the drill head chuck when the cutting tool is subjected to reversed thrust forces, such as caused by binding of the cutting tool in the work piece during withdrawal.

It should be understood that the invention is not limited to the exact details of construction shown and described herein for obvious modifications will occur to persons skilled in the art.

We claim:
1. A tool drive for a cutting tool comprising:
    a chuck having radially movable detent balls therein;
    a collar outwardly surrounding the chuck and having an outer annular ramp edge;
    a shaft connected to the chuck and positioned within a housing;
    means for displacing the shaft and connected chuck thereby moving the detent balls over the ramp edge which results in radial outward displacement of the balls and consequent enlargement of the chuck opening for insertion and removal of the cutting tool; and means for normally positioning the displacing means in an inoperative position wherein the detent balls are removed from the ramp end causing the balls to engage mating detent receptacles in the cutting tool base which secure the cutting tool in place;

wherein the shaft has a non-circular section and wherein the drive further includes:

a gear coaxially mounted to the shaft; and further gear means for driving the coaxially mounted gear and consequently the chuck.

2. The structure set forth in claim 1 wherein the displacing means is a push button and further wherein the means for normally positioning the displacement means comprises:

a bearing having a radially inward surface secured to the shaft, the outward surface of the bearing being slip fit within an interior bore of the push button;

a compression spring concentrically positioned over the shaft;

a first end of the spring abutting the coaxially mounted gear;

a second end of the spring abutting an inward transverse end of the bearing thereby transmitting a force to the shaft which biases the chuck and hence the detent balls away from the ramp edge;

a reverse thrust force on the cutting tool exceeding a preselected level which overcomes the bias causes displacement of the chuck, and consequently the detent balls, over the ramp edge which results in a release of the cutting tool.

3. The structure set forth in claim 1 wherein the displacing means is a push button and further wherein the means for normally positioning the displacement means comprises:

a bearing having a radially inward surface secured to the shaft, the outward surface of the bearing being slip fit within an interior bore of the push button;

a compression spring concentrically positioned over the shaft;

a first end of the spring abutting the coaxially mounted gear;

a second end of the spring abutting an inward transverse end of the bearing thereby transmitting a force to the shaft which biases the chuck and hence the detent balls away from the ramp edge;

a bore centrally extending through the shaft;

a second compression spring located in the bore;

a ball disposed at an outer end of the central bore for engaging the inner bore surface of the push button thus maintaining the push button in a normally outward position; and means actuated by a reverse thrust force on the cutting tool, exceeding a preselected level, overcoming the bias for locking the shaft and consequently the chuck thus ensuring retention of the cutting tool.

4. A right angle tool drive for a cutting tool having a base with detent receptacles formed therein, the drive comprising:

a chuck having radially movable detent balls therein;

a collar outwardly surrounding the chuck and having an outer annular ramp edge;

a shaft having a parallelogram cross section and connected to the chuck for assuming a position inwardly of a housing;

a push button having a transverse end exposed by an opening in the housing;

means for mechanically limiting outward movement of the push button;

a bearing fastened to an end of the shaft opposite the chuck and freely slidable within a housing enclosed bore of the button thereby permitting displacement of the shaft upon depression of the button resulting in movement of the detent balls over the ramp edge which results in radially outward displacement of the detent balls and consequent enlargement of the chuck opening for simple insertion and removal of the cutting tool;

a gear coaxially mounted to the shaft;

further gear means for driving the coaxially mounted gear and consequently the chuck;

a compression spring concentrically positioned over the shaft;

a first end of the spring abutting the coaxially mounted gear;

a second end of the spring abutting an inward transverse end of the bearing thereby transmitting a force to the shaft which biases the chuck and hence the detent balls away from the ramp edge.

5. The structure set forth in claim 4 together with a drive shaft perpendicularly positioned relative to a cutting tool and connected at its output end to the further gear means.

6. The structure set forth in claim 4 wherein the further gear means comprises a gear train having an input shaft thereof mounted in offset parallel relation to the cutting tool 7. The structure set forth in claim 4 further including:

a bore centrally extending through the shaft;

a second compression spring located in the bore;

a ball disposed at an outer end of the central bore . for engaging the inner bore surface of the push button thus maintaining the push button in a normally outward position; and means actuated by a reverse thrust force on the cutting tool, exceeding a preselected level overcoming the bias, for locking the shaft and consequently the chuck thus ensuring retention of the cutting tool.

* * * * *